(12) United States Patent
Taylor, Jr. et al.

(10) Patent No.: US 6,594,422 B2
(45) Date of Patent: Jul. 15, 2003

(54) OPTO-COUPLING DEVICE STRUCTURE AND METHOD THEREFOR

(75) Inventors: William J. Taylor, Jr., Round Rock, TX (US); Wei E. Wu, Austin, TX (US); Sebastian M. Csutak, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 197 days.

(21) Appl. No.: 09/846,087

(22) Filed: May 2, 2001

(65) Prior Publication Data

US 2002/0164122 A1 Nov. 7, 2002

(51) Int. Cl.[7] .................................................. G02B 6/34
(52) U.S. Cl. ............................ 385/37; 385/12; 385/14; 430/258; 257/432; 257/431; 257/414
(58) Field of Search ............................ 385/12, 37, 28, 385/18, 142; 359/333; 430/258

(56) References Cited

U.S. PATENT DOCUMENTS

| | | | |
|---|---|---|---|
| 3,982,810 A | 9/1976 | Tamir et al. .................. 350/96 |
| 4,006,432 A | 2/1977 | Streifer et al. .............. 331/94.5 |
| 4,725,524 A | * 2/1988 | Elzer et al. .................. 430/258 |
| 5,026,148 A | 6/1991 | Wen et al. | |
| 5,033,812 A | 7/1991 | Yoshida et al. .......... 350/96.19 |
| 5,101,459 A | 3/1992 | Sunagawa ..................... 385/37 |
| 5,315,676 A | 5/1994 | Sunagawa ..................... 385/37 |
| 5,657,407 A | 8/1997 | Li et al. ....................... 385/37 |
| 6,043,936 A | 3/2000 | Large | |
| 6,087,707 A | * 6/2000 | Yamamoto et al. ........... 385/14 |
| 6,433,399 B1 | * 8/2002 | Polman et al. ............... 257/432 |

FOREIGN PATENT DOCUMENTS

| | | | |
|---|---|---|---|
| EP | 0383627 B1 | 8/1990 | ............ G02B/6/12 |
| EP | 0 488 868 A1 | 10/1991 | |
| EP | 0 481 552 A1 | 4/1992 | |
| EP | 0 616 373 A2 | 9/1994 | |

OTHER PUBLICATIONS

Ang et al., "Effects of Grating Heights on Highly Efficient Unibond SOI Waveguide Grating Couplers," IEEE, pp. 59–61 (2000).
Ang et al., "Highly efficient unibond silicon–on–insulator blazed grating couplers," American Institute of Physics, Applied Physics Letter, vol. 77 No. 25, Dec. 18, 2000, pp. 4214–4216.
Orobtchouk et al., "High–efficiency light coupling in a submicrometric silicon–on–insulator waveguide," Applied Optics, vol. 39 No. 31, Nov. 1, 2000, pp. 5773–5777.
Ang et al., "Grating couplers using Silicon–On–Insulator," SPIE vol. 3620, Jan. 1999, pp. 79–86.
Chen et al., "High–efficiency and high–speed silicon metal–semiconductor–metal photodetectors operating in the infrared," American Institute of Physics, Applied Physics Letter 70, Feb. 10, 1997, pp. 753–755.

(List continued on next page.)

Primary Examiner—Hemang Sanghavi
Assistant Examiner—Eric Wong
(74) Attorney, Agent, or Firm—James L. Clingan, Jr.; Kim Marie Vo

(57) ABSTRACT

A manufacturing technique for making grating features utilizes the etching characteristics for photoresist to provide desirable geometric shapes in close proximity to each other. This results in a grating for optocoupling, which is manufacturable and provides efficient coupling. A silicon waveguide is conveniently achieved using a SOI substrate so that the insulator underlying the silicon provides one material adjoining the silicon with a lower index of refraction than silicon. The top surface of the silicon has the desirable geometric shapes that result also in a lower index of refraction than silicon above the main body of the silicon substrate.

26 Claims, 4 Drawing Sheets

OTHER PUBLICATIONS

Liao et al., "High–Efficiency Focusing Waveguide Grating Coupler with Parallelogramic Groove Profiles," IEEE, pp. 1142–1148 (1997).

Liu et al., "140–GHz metal–semiconductor–metal photodetectors on silicon–on–insulator substrate with a scaled active layer," American Institute of Physics, Applied Physics Letter 65, Aug. 15, 1994, pp. 887–888.

Emmons et al., "Buried–Oxide Silicon–on–Insulator Structure II: Waveguide Grating Couplers," IEEE, pp. 164–174 (1992).

Weller–Brophy et al., "Local Normal Mode Analysis of Guided Mode Interactions with Waveguide Gratings," IEEE, pp. 1069–1081 (1988).

Andersson et al., "Coupling of Radiation into Quantum Well Infrared Detectors by the Use of Reflection Gratings and Waveguide Structures", *Intersubband Transitions in Quantum Wells*, Plenum Press, New York and London, Published in cooperation with NATO Scientific Affairs Division, Sep. 9–14, 1991, pp. 1–13.

Andersson et al., "Near–unity Quantum Efficiency of AlGaAs/GaAs Quantum Well Infrared Detectors Using a Waveguide with a Doubly Periodic Grating Coupler", *App. Phys. Lett.*, Aug. 12, 1991, vol. 59, No. 7, pp. 857–859.

* cited by examiner

US 6,594,422 B2

OPTO-COUPLING DEVICE STRUCTURE AND METHOD THEREFOR

RELATED APPLICATIONS

This application is related to application SC11501TP, entitled "Optical Device and Method Therefor," and assigned to the assignee hereof.

FIELD OF THE INVENTION

This invention relates to opto-coupling and, more particularly, to integrated circuit device structures useful in opto-coupling.

RELATED ART

One of the techniques used in opto-coupling is known as diffraction grating. This type of technique utilizes spaced grating features that provide a bend in the light so that the light is directed along a waveguide to an objective or from a source outside the waveguide. This is very desirable anytime there is a need to interface light between two points so that if light is being transmitted along a waveguide and is desirably sent outside of the waveguide or light is originating outside the waveguide and is desirably to be in the waveguide, a grating can be utilized to achieve this. One of the difficulties is that the grating is made up desirably of a number of grating features. The features must be spaced apart in a relationship that provides for the desirable bending to occur. This bending is dependent in a large measure on the frequency of the light. For the light to be effectively bent, the features have a certain spatial periodicity as well as the features themselves having certain desirable characteristics. In particular, higher frequencies require features that have a smaller period which effectively means they have to be closer together. This has been difficult to achieve in a manufacturable manner for the high frequencies that are being found to potentially useful in significantly improving the speed of integrated circuits.

Typically integrated circuit diffraction grating has been achieved by e-beam techniques. This is undesirable, although somewhat effective, because of the time required to achieve the patterning by e-beam. Also, the shape of the grating features is important. With the e-beam techniques the shape has been substantially limited to square and parallelogram type features. With respect to these individual grating features, it is important that the shape be predictable and that it have a shape which provides good coupling and transmission of the light between the waveguide and the grating. The feature must be smooth and consistent from one integrated circuit to the next. The spacing of the grating features is also coordinated with the shape. Typically these are used with polarized light because that is more efficient in the typical grating that has been provided in the prior art. Also smoothness has been difficult to achieve. So, there are situations where it may be desirable to not have to have polarized lights in which case the coupling would be very inefficient.

Thus, there is a need for a manufacturable technique for making a diffraction grating and a need for diffraction gratings of high quality.

BRIEF DESCRIPTION OF THE DRAWINGS

The present invention is illustrated by way of example and not by limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

A manufacturing technique for making grating features utilizes the etching characteristics for photoresist to provide desirable geometric shapes in close proximity to each other. This results in a grating for optocoupling which is manufacturable and provides efficient coupling.

Figure 1:
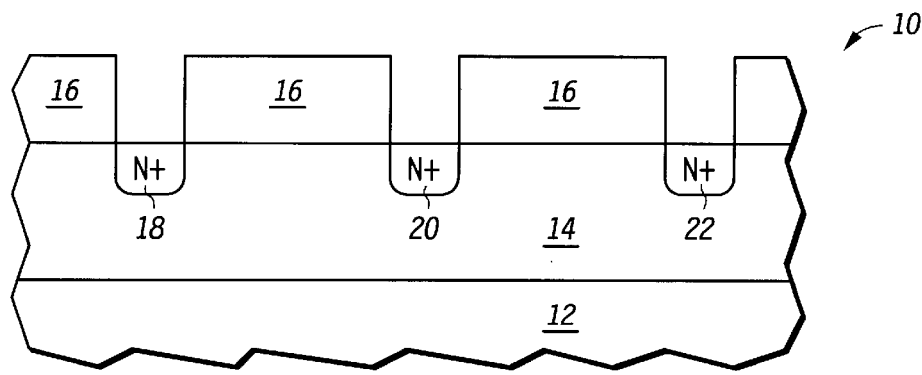
FIG. 1 is a cross section of a portion of an integrated circuit at a stage in processing according to an embodiment of the invention.

Shown in FIG. 1 is a portion of an integrated circuit 10 comprising a insulating region 12, a semiconductor region 14, a patterned photoresist 16, an N-doped region 18, an N-doped region 20, and an N-doped region 22. Pattern photoresist 16 results from patterning a photoresist layer which was deposited over semiconductor region 14. Typically an oxide layer, not shown, would be between the photoresist and the silicon. After patterning this photoresist layer, photoresist 16 is provided. An N+ implant then occurs to form N+ regions 18, 20 and 22. Insulating region 12 and semiconductor region 14 comprise a silicon on insulator (SOI) substrate, which is readily available in the industry.

Figure 2:
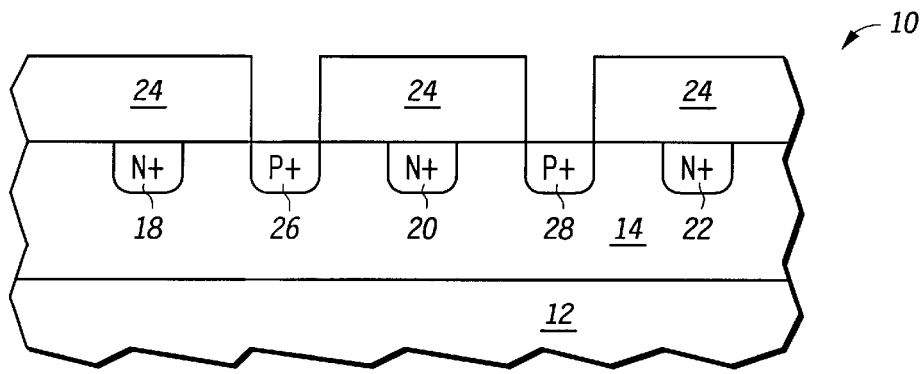
FIG. 2 is a cross section of the integrated circuit of FIG. 1 at a subsequent stage in processing.

Shown in FIG. 2 is integrated circuit 10 after pattern photoresist 16 has been deposited and another photoresist layer has been deposited and patterned to result in patterned photoresist layer 24. Pattern photoresist layer 14 provides as a mask for a P-type implant, which results in P-doped regions 26 and 28. P-doped regions 26 and 28 are interleaved between N-doped regions 18, 20 and 22.

Figure 3:
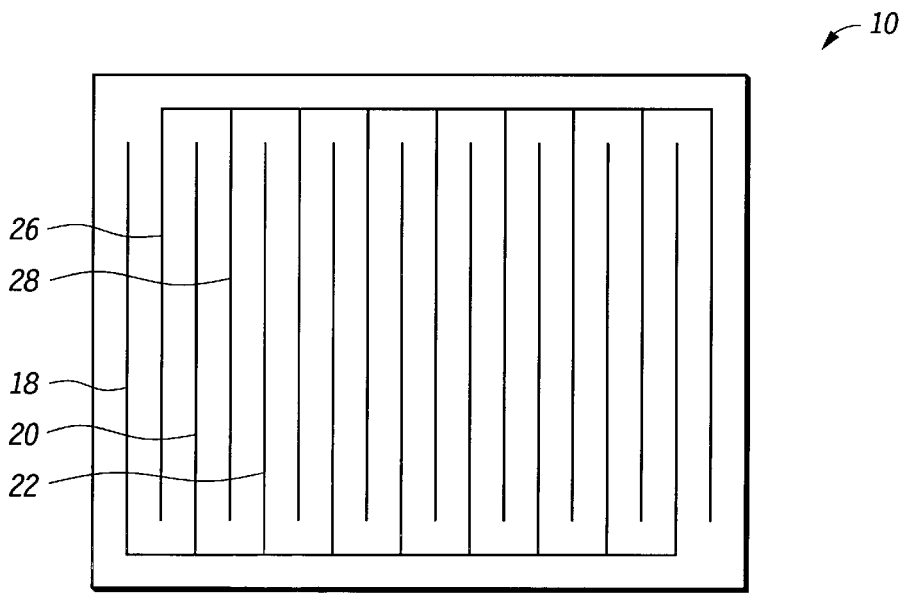
FIG. 3 is a top view of the integrated circuit of FIG. 2.

Shown in FIG. 3 is a top view of an additional portion of integrated circuit 10 showing the interleaving of N and P doped regions. This shows N-doped regions having a common connection at the bottom and P-doped regions having a common connection at the top. This portion of integrated circuit 10 shows the target area of incident light.

Figure 4:
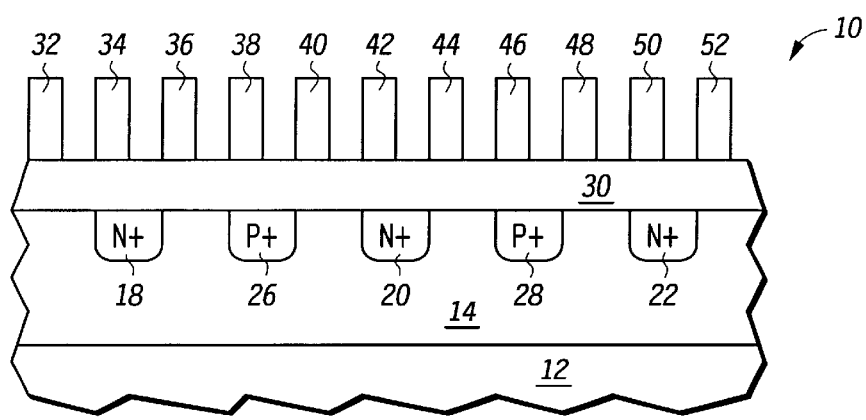
FIG. 4 is a cross section of integrated circuit of FIG. 2 at a subsequent stage in processing.
Figure 5:
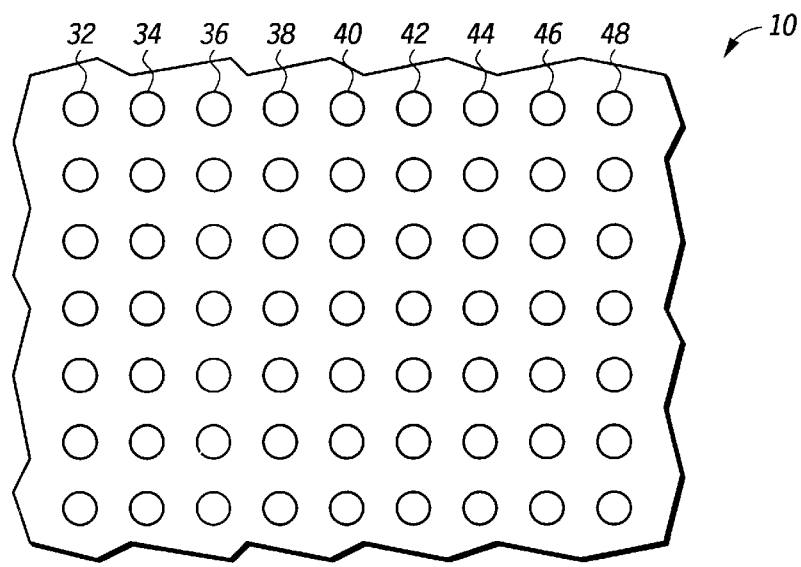
FIG. 5 is a top view of the integrated circuit of FIG. 4.

Shown in FIG. 4 is after additional processing of integrated circuit 10. A nitride layer 30 is deposited over semiconductor region 14. A photoresist layer is then deposited over nitride layer 30 and patterned to form a pattern photoresist layer comprising photoresist pillars 32, 34, 36, 38, 40, 42, 44, 46, 48, 50 and 52. These pillars 32-52 are substantially cylindrical in shape, which is reasonably easy to achieve. Shown in FIG. 5 is a portion of integrated circuit 10, as a top view at the stage in processing shown in FIG. 4., which shows the pillars in a matrix fashion.

Figure 6:
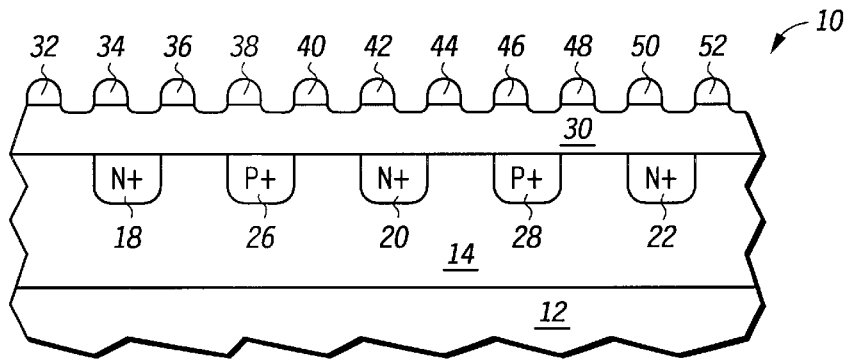
FIG. 6 is a cross section of the integrated circuit of FIG. 4 at a subsequent stage in processing.
Figure 7:
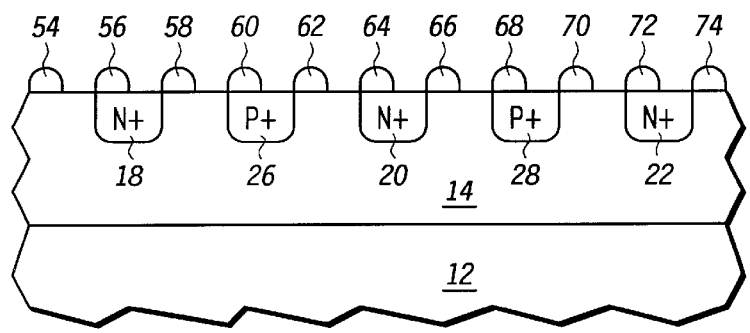
FIG. 7 is a cross section of a integrated circuit of FIG. 6 at a subsequent stage in processing.

Shown in FIG. 6 is integrated circuit 10 at a stage in processing after a partial etch of photoresist pillars 32-48 and nitride layer 30. This shows that pillars 32-52 are not only being reduced in height but also being reduced in diameter. The etch of the nitride is directional but the photoresist is nonetheless etched laterally as well so that the photoresist pillars, whose sidewalls are exposed, are reduced in diameter to expose more and more of the nitride. But the nitride that has received the maximum exposure is that area which is between the original pillars. As the pillars decline in diameter additional nitride is exposed. Thus, there is a slope formed in the nitride toward the photoresist. The etch of the nitride between photoresist pillars continues and the result is shown in FIG. 7. This shows hemispherical shaped nitride features 54, 56, 58, 60, 62, 64, 66, 68, 70, 72 and 74. These nitride features are positioned to have a periodicity chosen for the frequency that is desired to be passed between semiconductor region 14 and an area above nitride features 54-74. Nitride features 54-74 comprise an optocoupling grating.

Semiconductor region 14 operates as a waveguide with nitride features 54-74 operating as the opto-coupling diffraction grating. The silicon of semiconductor region 14 has a higher index of refraction than the silicon oxide of insulating layer 12. Another insulating layer may also be used which has a lower index of refraction than that of the semiconductor layer above it. The nitride features also have a lower index of refraction than the semiconductor layer 14.

There is a dimension of periodicity of the nitride features that will result in light traveling laterally in patterned semiconductor region 14 which will also pass through the diffraction grating of nitride features 54-74. The typical angle of incident of light with respect to the opt-coupling grating is 80 degrees plus or minus 5. Thus, it is near vertical but not quite. The periodicity of nitride features 54-74 is selected based upon the frequency of the incident light at nominally 80 degrees. A typical and standard frequency for local area networks (LAN) is light with a wavelength of about 850 nanometers (nm) for the nominal angle of 80 degrees for the light entering the opto-coupling diffraction grating. The period using nitride for the grating is about 290 nanometers (nm). At this wavelength of 850 nm light is absorbed by silicon so the intended use is as a photodetector with the benefit of very good efficiency. The doped regions 18-22 and 26-28 are used to collect the photo-generated carriers.

This diffraction grating can also be used at for a wavelength of 1310 nm, which is the standard for metropolitan area network, but would be used as a transmitter with silicon as the waveguide as is the case shown in FIG. 7 for which semiconductor region 14 is described as being silicon. Semiconductor region 14 may, however, be a different composition, such as silicon-germanium, that would make it sensitive to 1310 nm radiation. One way to do this is to alloy the silicon with germanium. Another alternative for semiconductor region 14 is germanium An advantage of the hemispherical shape is that the efficiency of coupling is not significantly affected by the polarization of the incident light. Thus, non-polarized light will pass very well through the opto-coupling grating in which the individual features are hemispherical. If instead of using a matrix of small features, a number of fingers that are in parallel with each other are used, the bending is effective based upon the periodicity of the fingers but the coupling is only good for the light that is polarized in the direction of the fingers. The light which has polarization aligned perpendicular to the features is substantially blocked.

Figure 10:
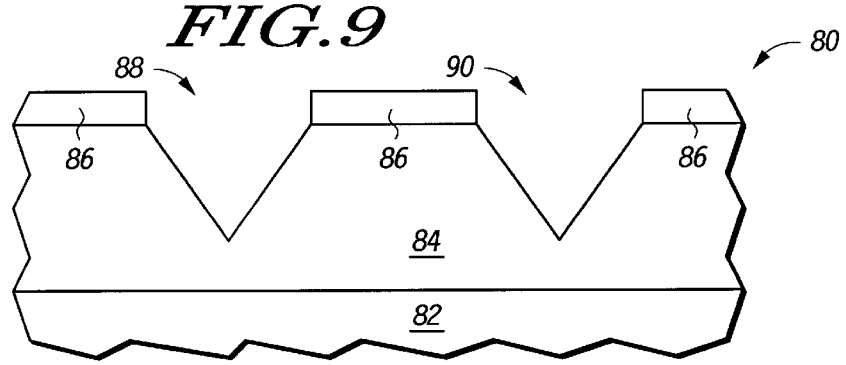
FIG. 10 is a cross section of an integrated circuit of FIG. 9 at subsequent stage in processing.
Figure 11:
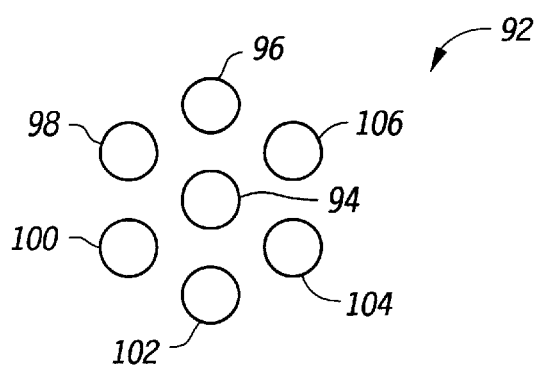
FIG. 11 is a top view of an arrangement of grating features according to an embodiment of the invention.

An alternative to the square matrix shown for example, in FIG. 5, is to have each photoresist pillar be of equal distance from the others. This would be six pillars equidistant from any other pillar, as shown in FIG. 10. This could be called a hexagonal pattern because it would be six pillars equidistant from any other pillar. This may be the most effective for passing non-polarized light and is mostly usefully implemented if the diffraction features, such as pillars nitride pillars 54-74, are round. Shown in FIG. 11 is hexagonal pattern 92 comprised of round diffraction features 96, 98, 100, 102, 104, and 106, which surround diffraction feature 94 with a radius that is equal to the desired period for the grating to achieve the desired bending for the particular frequency.

The purpose of N-doped regions and P-doped regions such as 18-22 and 26-28 is to collect electrons for the case of N-doped regions and collect holes for the P+ regions. Semiconductor region 14 is doped very lightly to P−, a typical starting material for an integrated circuit but even lower doping levels may be even more advantageous. The use of an etchant, which directionally attacks the nitride 30 while simultaneously etching the sidewall of the photoresist pillar is used to advantage to obtain the round shape. This is a desirable shape which provides for a matrix such as shown in FIG. 5 or for the hexagonal approach of FIG. 10, which provides equal distance for all of the ultimate nitride features which make up the grating which then can maximize the coupling. The hexagonal pattern provides for the optimal symmetry, which provide the desired periodicity. The distance between two neighboring features plus the diameter of one of the features is the measure of the period.

Figure 8:
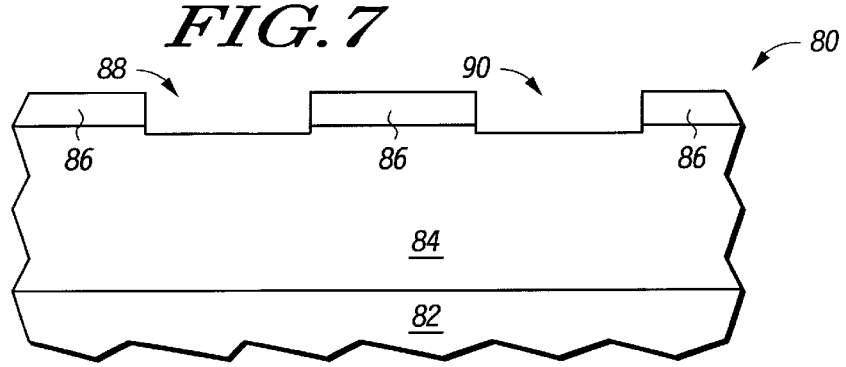
FIG. 8 is a cross section of an integrated circuit at a stage in processing according to an alternative embodiment.

As an alternative to the hemispherical grating features, such as nitride features 54-74 which protrude above the semiconductor region 14, the grating features may also be cavities in the semiconductor region. Shown in FIG. 8 is a portion of an integrated circuit 80 having a semiconductor region 84, which in the present embodiment is silicon, and insulating region 82, a patterned nitride layer 86 with openings 88 and 90 in the nitride. Also, this is achieved by applying photoresist, patterning the photoresist, and then etching the nitride according to the pattern in the photoresist. This leaves openings 88 and 90. Openings 88 and 90 are then roughed by an ion bombardment. This lowers the level of silicon in openings 88 and 90 slightly as well as roughening the surface of the silicon at openings 88 and 90. After the ion bombardment of openings 88 and 90, an etch comprised of potassium hydroxide (KOH) in liquid form is performed. With the crystal structure of silicon, a wet KOH etch is anisotropic. This etch is along the 111 plane of the silicon, substrate 84. The result is a pyramid shape removed from the silicon in openings 88 and 90.

Figure 9:
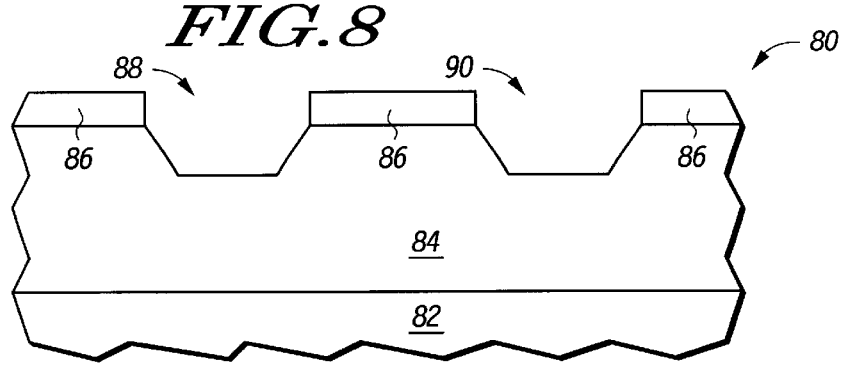
FIG. 9 is a cross section of an integrated circuit of FIG. 8 at a subsequent stage in processing.

Shown in FIG. 9 is a stage in the processing using the wet KOH etch to etch at the angle shown and is along the 111 plane of silicon region 84. The etch continues with the result shown in FIG. 10, which is a pyramid-shaped cavity in semiconductor region 82. This is an advantageous process because it is highly repeatable. The etching will essentially stop once the pyramid is formed. The etch rate is extremely slow into the 111 plane but rapid along it. Thus, what is left is the silicon aligned in the 111 direction. These pyramids thus can replace the nitride features that protrude above the silicon surface and instead be cavities within the silicon region. The pyramid-shaped features, which are surrounded by air, form a layer with a lower average index of refraction than silicon. Thus the silicon, substrate 84, is effective as a waveguide because it has a lower index of refraction both above and below it.

The period of these pyramid shapes can be achieved as desired. The period in this case is the distance between openings 88 and 90 plus the length of one of these openings shown in FIG. 9. These pyramids shapes can be aligned in the matrix shown in FIG. 5 for the photoresist pillars. If integrated circuit 10 is used as a photodetector, the doped regions would be conveniently placed to optimize the collection of carriers generated by the incident light.

Figure 12:
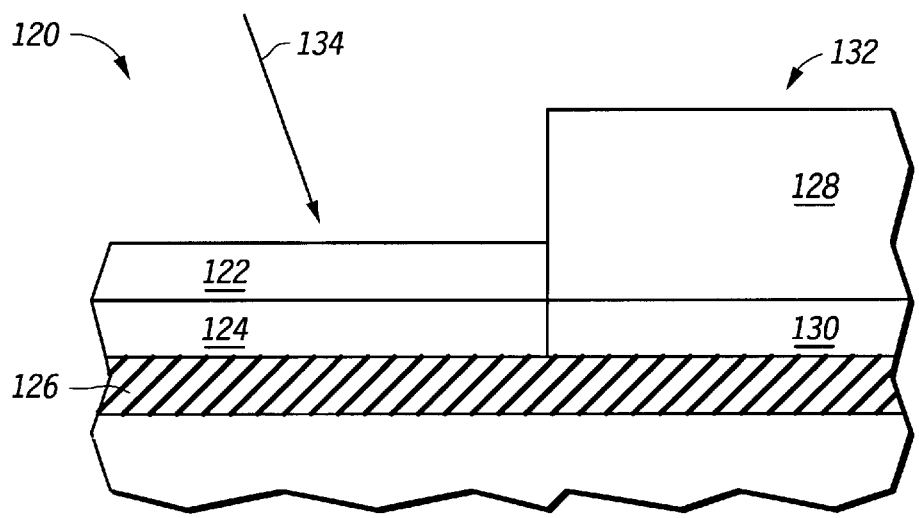
FIG. 12 is a cross section of the semiconductor substrate having a photodetector and processing circuitry according to a preferred embodiment of the present invention.

Shown in FIG. 12 is an integrated circuit 120 comprising a grating 122, a detector 124, an insulator 126, gates and interconnect 128, and sources and drains 130. Integrated circuit 120 utilizes a conventional semiconductor-on-insulator (SOI) substrate in which the semiconductor is preferably silicon and insulator 126 is below the silicon. The silicon is the active region of integrated circuit 120 and is where detector 124 and drains and sources 130 are located. The silicon corresponds to semiconductor region 14 shown in FIG. 2. The regions doped regions 18-22 and 26-28 are relatively highly doped compared to the rest of semiconductor region 14 which is lightly doped to less than or equal to about $10^{14}$ atoms/cm$^2$. The A relatively thick layer of silicon underlies insulator 126 primarily to provide physical support. Detector 124 is formed in the silicon above insulator 126. Grating 122 is formed above the silicon substrate surface although, as an alternative, the grating may be formed as part of the silicon itself. Gates and interconnect 128 are formed above the silicon surface which in this case is coincident with top of detector 124. Sources and drains 130 are formed in the silicon surface. The combination of gates and interconnect 128 and sources and drains 130 form a processing circuitry 132, which utilizes information collected by detector 124. In operation, incoming light 134 strikes grating 122 and generates in the silicon carriers that are detected by detector 124. After detection by detector 124, processing circuitry 132 processes this detected signal in a manner according to a chosen design.

Figure 13:
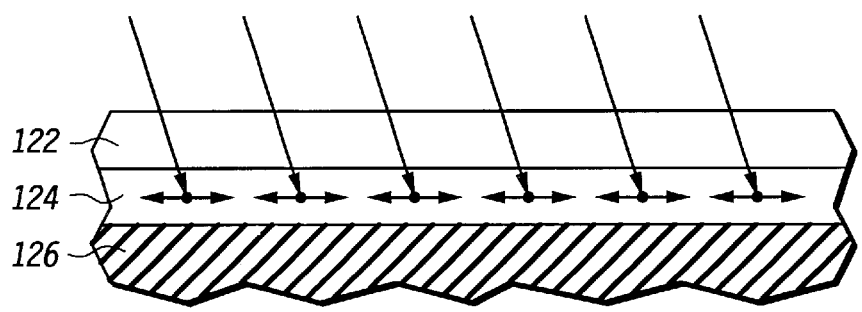
FIG. 13 is a cross section of a portion of the detector shown in FIG. 12.

Shown in FIG. 13 is grating 122, detector 124, and insulator 126 showing the action of incident light on grating 122. This shows that the incident light is striking the grating area, that it enters detector area 124, and that it stays in the area of detector 124. Area between grating 122 and insulator 126 is a waveguide so that the light that enters this waveguide remains there. Thus, detector 124 is in close proximity to the carriers that are created by incident light entering the silicon. Because of grating 122, the incident light is redirected so that it is contained within the waveguide. This results in all the carriers being generated in the waveguide. The detector is also located in the waveguide so that the detector is in close proximity to the areas where the carriers are generated. This results in short distances for the carriers so that are in the relatively strong electric field region of the doped regions that make up the detector. Thus, there is no speed problem in the collection portion of operation.

Also, with all the incident light being contained within range of the detectors, the efficiency is very high. This provides a benefit of ease of detection of the information containing in the incoming light. Grating 122 can be chosen from any of those described in the formation of a grating described for FIGS. 1–11. For example, grating 122 may be the nitride features 54-74 shown in FIG. 7. In the alternative they may be inverted pyramids such as 88 and 90, which are actually formed in the silicon. Detector 124 may be like that shown in FIGS. 2,3, 4, 6, and 7.

The desired angle of incident light 134 is chosen to optimize the efficiency of transmitting the light into the waveguide created between grating 122 and insulator 126. If 90-degree incident light is utilized then the light entering waveguide would also be 90 degrees in both directions shown in FIG. 13 and actually radially in all directions. This may be preferable. It may also be preferable to have the light come in on one portion of the grating at an angle so that it only goes into the waveguide in one direction or at least not in all directions. The grating area and the detector area in most cases would be generally the same size. The incoming light will have a spot size as well. It's desirable for efficiency for the grating and the detector to be larger than the spot size of the incident light. Thus it may be desirable for the spot to be received on one side of the grating and angled to the other side of the grating so that all the light is directed towards the side of the grating away from where the spot is received. In the alternative, especially if the light is received at 90 degrees, the beam spot would be desirably located in the middle of the grating.

Gates and interconnect 128 are depicted as a block above the silicon portion of the substrate. This is depicting a typical configuration of an integrated circuit made on silicon. The transistors are a combination of the gates that are above the silicon and sources and drains are in the silicon. The combination of sources and drains and gates and interconnects are the tools by which integrated circuits are typically made. These integrated circuits can be quite simple or they can be extremely complex such as a microcomputer or microprocessor. They can have a variety of functions as well such as memory, digital to analog converters, and amplifiers. This is shown to indicate the planned integration of a photodetector with normal integrated circuit structures. The information retrieved by detector 124 may be transmitted to processing circuitry 132 by a source and drain type of interconnect or it may be achieved by an above substrate interconnect such as metal or polysilicon.

The thicknesses of the insulator and detector and the height of the grating are chosen in relation to the frequency of the incident light. The spacing of the grating features is also chosen in relation to the frequency. In the present example, the expected frequency corresponds to a wavelength of 850 nm. The thickness of insulator 126 is chosen to be an odd multiple of a quarter optical wavelength of the light with respect to insulator 126. Thus, the index of refraction must be taken into account. In this case insulator 126 is preferably silicon oxide, which has an index of refraction of 1.45. Thus the thickness of insulator 126 is preferably about one fourth of 850 nm divided by 1.45, which is about 146 nm, or odd multiples of this number.

Similarly, the sum of the thicknesses of the waveguide and the grating, which is shown in FIG. 12 as detector 124 and grating 122, is one half of the optical wavelength or even multiples of this number. The average index of refraction of the silicon waveguide and the average index of refraction of the grating must be taken into account. In the case of the grating, the index of refraction of air must be averaged with the material that forms the grating feature. This averaging must take into account the square relationship required for averaging indexes of refraction. The waveguide is silicon with an index of refraction of 3.62. For a simple example where the volume of features is the same as the volume of air in the grating and the features are silicon, the average index of refraction equals the square root of the quantity of the square of 3.62 plus the square of 1 all divided by 2. Thus the index of refraction is the square root of 13.1 plus 1 divided by two, which equals the square root of 7.05, which equals 2.65. Thus, the thickness of the waveguide times 3.62 plus the height of the grating times 2.65 equals one half of 850 nm. A benefit of this approach is that the thickness of the waveguide and the height of the grating can be varied so long as this condition is met.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of detecting light, comprising:
providing a first material, with a first refractive index;
providing a second material over the first material, wherein the second material has a second refractive index and the second refractive index is greater than the first refractive index;
providing a doped region in the second material;
providing a third material over the second material with a third refractive index;
depositing a photoresist layer over the third material;
patterning the photoresist layer to leave a pattern of the photoresist;
etching the third material according to the pattern of the photoresist;
removing the photoresist;
exposing at least a portion of the second material and the third material to the light to couple the light into the second material to generate carriers; and
collecting carriers.

2. The method of claim 1, wherein the second material and third material are the same.

3. The method of claim 1, wherein the first material is an oxide layer.

4. The method of claim 1, wherein the second material comprises silicon.

5. The method of claim 4, wherein the second material further comprises germanium.

6. The method of claim 1, wherein the third material comprises silicon.

7. The method of claim 6, wherein the third material further comprises nitride.

8. The method of claim 6, wherein the third material further comprises Silicon Oxide.

9. The method of claim 1, wherein etching the third material is performed using KOH.

10. The method of claim 9, further comprising roughening a surface of the third material and removing the pattern of the photoresist layer as the third material using KOH is etched.

11. The method of claim 10, wherein roughening the surface of the third material is performed by dry etching the third material.

12. The method of claim 1, wherein etching the third material is performed by dry etching.

13. The method of claim 1, further comprising forming collector regions.

14. The method of claim 1, wherein the plurality of features are approximately equidistant from each other.

15. The method of claim 1, wherein etching the third material further comprises etching the third material in a first direction and a second direction along a plane parallel to a surface of the third material, wherein the first direction is orthogonal to the second direction.

16. The method of claim 1, wherein the first direction is etched slower than the second direction.

17. The method of claim 1 further comprising removing a second portion of the photoresist layer.

18. The method of claim 1 wherein the third refractive index is less than the second refractive index.

19. The method of claim 1 wherein the light has a wavelength of approximately 850 nanometers.

20. A method of forming an opto-coupling structure on a substrate having a silicon layer with a surface, comprising:
forming a silicon oxide layer over the surface of the silicon layer;
depositing a photoresist layer over the silicon oxide layer;
patterning the photoresist layer to remove a first portion of the photoresist layer;
etching the silicon oxide layer to leave a first pattern of silicon oxide and a second pattern of exposed silicon;
roughing the exposed silicon; and
applying an etchant comprising potassium, oxygen, and hydrogen to the first pattern of silicon oxide and the second pattern of exposed silicon to leave pyramid shaped silicon features according to the first pattern.

21. The method of claim 20, wherein the step of roughing the exposed silicon is performed by ion milling.

22. A method of forming an opto-coupling structure on a substrate having a semiconductor layer with a surface, wherein the semiconductor of the semiconductor layer has a crystal orientation, comprising:
forming a first layer over the surface of the semiconductor layer;
depositing a photoresist layer over the first layer;
patterning the photoresist layer to remove a first portion of the photoresist layer;
etching the first layer to leave a first pattern of the first layer and a second pattern of exposed semiconductor of the semiconductor layer;
roughing the exposed semiconductor; and
applying an etchant, which is selective to the orientation of the semiconductor and the first layer, to the first pattern of the first layer and the second pattern of the exposed semiconductor wherein geometric shapes are left according to the first pattern.

23. The method of claim 22 wherein the first pattern is hexagonal.

24. The method of claim 22, wherein each of the geometric shapes is a pyramid.

25. The method of claim 22, wherein the semiconductor is silicon, the first layer is silicon oxide, and the etchant is KOH.

26. The method of claim 22, wherein the semiconductor is characterized as being one of germanium and silicon-germanium.

* * * * *